(12) United States Patent
Dommety et al.

(10) Patent No.: US 8,296,560 B2
(45) Date of Patent: Oct. 23, 2012

(54) METHOD AND APPARATUS FOR RESTRICTING ADDRESS RESOLUTION PROTOCOL TABLE UPDATES

(75) Inventors: Gopal Dommety, San Jose, CA (US); Thenmozhi Palaniappan, Sunnyvale, CA (US); Ronald Maxam, Renton, WA (US)

(73) Assignee: Cisco Technology, Inc., San Jose, CA (US)

( * ) Notice: Subject to any disclaimer, the term of this patent is extended or adjusted under 35 U.S.C. 154(b) by 63 days.

(21) Appl. No.: 12/423,685

(22) Filed: Apr. 14, 2009

(65) Prior Publication Data

US 2009/0222548 A1 Sep. 3, 2009

Related U.S. Application Data

(63) Continuation of application No. 10/618,127, filed on Jul. 11, 2003, now Pat. No. 7,533,255.

(51) Int. Cl.
*H04L 29/06* (2006.01)

(52) U.S. Cl. .......................... 713/153; 709/223; 709/229

(58) Field of Classification Search ........................ None
See application file for complete search history.

(56) References Cited

U.S. PATENT DOCUMENTS 7,434,254 B1 * 10/2008 Foschiano et al. .............. 726/13
2007/0008942 A1 * 1/2007 Ocepek et al. ................ 370/338

* cited by examiner

*Primary Examiner* — Fikremariam A Yalew
(74) *Attorney, Agent, or Firm* — Hickman Palermo Truong Becker Bingham Wong LLP; Karl T. Rees

(57) ABSTRACT

Techniques for restricting Address Resolution Protocol (ARP) table updates to updates originating from authorized subsystems is disclosed. According to an embodiment, an instruction to update an ARP table is received. It is determined whether a command interface from which the instruction originated is authorized. If the command interface is authorized, then the ARP table is updated based on the instruction. According to an embodiment, a DHCP Server may be configured to send an instruction to update an ARP table upon receiving a DHCP message indicating a network layer address that is not bound with a data link layer address. The DHCP Server may send the instruction over an authorized command interface, or be in other ways authorized to update the ARP table.

25 Claims, 6 Drawing Sheets

METHOD AND APPARATUS FOR RESTRICTING ADDRESS RESOLUTION PROTOCOL TABLE UPDATES

CROSS-REFERENCE TO RELATED APPLICATIONS; PRIORITY CLAIM

This application claims benefit as a Continuation of application Ser. No. 10/618,127, filed Jul. 11, 2003, now U.S. Pat. No. 7,533,255 the entire contents of which is hereby incorporated by reference as if fully set forth herein, under 35 U.S.C. §120. The applicant(s) hereby rescind any disclaimer of claim scope in the parent application(s) or the prosecution history thereof and advise the USPTO that the claims in this application may be broader than any claim in the parent application(s).

FIELD OF THE INVENTION

The present invention generally relates to computer network security. The invention relates more specifically to a method and apparatus for restricting Address Resolution Protocol (ARP) table updates.

BACKGROUND OF THE INVENTION

The approaches described in this section could be pursued, but are not necessarily approaches that previously have been conceived or pursued. Therefore, unless otherwise indicated herein, the approaches described in this section are not prior art to the claims in this application and are not admitted to be prior art by inclusion in this section.

For various reasons, it is often desirable to restrict access to a computer network, such as a local area network (LAN), wide area network (WAN), or inter-network. For example, a provider of computer network services may wish to allow only subscribing users to access the provider's computer network. By restricting access in this way, the provider can obtain compensation from the subscribing users in exchange for computer network access. Additionally, by restricting access in this way, the provider can prevent the quality of the computer network's services from being diluted by non-subscribing users.

In certain computer network configurations, all data traffic between a user and a provider's computer network is communicated through a network access point in the provider's computer network. A network access point may comprise a network router that comprises a Dynamic Host Configuration Protocol (DHCP) server. DHCP is described in the Internet Engineering Task Force (IETF) Request For Comments (RFC) 2131. When a user's device initially connects to a provider's computer network through the network access point, the user's device obtains, dynamically, from the DHCP server, a network layer address selected from a set of legitimate network layer addresses. The network layer address is assigned to the user's device. This dynamically assigned network layer address identifies the user's device to the provider's computer network. In the provider's computer network, all data that is to be sent to the user is addressed to the dynamically assigned network layer address, which may be, for example, an Internet Protocol (IP) address.

An entry is added to the network router's ARP table. ARP is described in IETF RFC 826. The entry indicates a binding between the dynamically assigned network layer address and a data link layer address, such as a Media Access Control (MAC) address, of the user's device. Whenever the network router receives a data packet that is addressed to the network layer address, the network router consults the ARP table to find the entry that contains the network layer address. From the entry, the network router determines the data link layer address that is bound to the network layer address. The network router then encapsulates the data packet into a frame that indicates the data link layer address, and sends the frame to the device that is associated with the data link layer address; i.e., the user's device. Without the entry in the ARP table, the network router would be unable to deliver the data packet to the user's device.

In an effort to restrict computer network access solely to subscribing users, the provider may implement a security mechanism such as a login procedure. The security mechanism may request a username and associated password from the user. If the user provides a username and associated password that the security mechanism recognizes, then the security mechanism may allow the user to access the computer network for a specified amount of time or until the user elects to logout. Alternatively, if the user fails to provide a username and associated password that the security mechanism recognizes, then the security mechanism may prevent the user from accessing the computer network.

If the user successfully provides a recognized username and associated password, then the security mechanism associates the dynamically assigned network layer address with the username. Therefore, any network activity attributable to the network layer address is attributable to the username. To receive compensation for such network activity, the provider may bill the user associated with the username. When the user logs off through a provided mechanism, then the username is no longer associated with the network layer address.

Unfortunately, even after a legitimate network layer address has been associated with an authenticated username, it is relatively easy for a rogue user to cause a different data link layer address to be bound to the legitimate network layer address in the network router's ARP table. The rogue user only needs to send, to the network router, a forged ARP message that indicates that the legitimate network layer address is associated with the data link layer address of the rogue user's device. In response to receiving the forged ARP message, the network router ignorantly updates the network router's ARP table to contain a binding between the legitimate network layer address and the data link layer address of the rogue user's device. Thereafter, the rogue user can access the provider's computer network, and the rogue user's network activities will be attributed to the authenticated username.

This is just one of several ways in which access restrictions can be circumvented. Additionally, a user may guess or otherwise determine a legitimate network layer address within the provider's computer network, and use that network layer address instead of the network layer address that was dynamically assigned by the DHCP server. In that case, the entry added to the network router's ARP table indicates a binding between the data link layer address of the user's device and a network layer address which, although legitimate, was not assigned by the DHCP server. Some network activity tracking systems cannot detect that a user has logged off or otherwise disconnected from a network unless the user's device is associated with a network layer address assigned by the DHCP server. As a result, the user may remain logged on to the provider's network even after the user thought that he had logged off using a provided mechanism. This can cause internal processing errors or result in incorrect billing of service to the user.

The problems described above are at least partially a consequence of a lack of restrictions imposed on ARP table updates. Based on the foregoing, there is a clear need for a method of restricting ARP table updates to updates originating from authorized subsystems.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for restricting ARP table updates to updates originating from authorized subsystems is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:
1.0 General Overview
2.0 Structural and Functional Overview
3.0 Method of Restricting ARP Table Updates To Updates Originating From Authorized Subsystems
  3.1 Processing Received Updates
  3.2 Process of Sending An Instruction To Update An ARP Table
4.0 Implementation Mechanisms—Hardware Overview
5.0 Extensions and Alternatives
1.0 General Overview The needs identified in the foregoing Background, and other needs and objects that will become apparent from the following description, are achieved in the present invention, which comprises, in one aspect, a method of restricting Address Resolution Protocol (ARP) table updates to updates originating from authorized subsystems. According to one aspect of the method, an instruction to update an ARP table is received. It is determined whether a particular subsystem from which the instruction originated is authorized. If the particular subsystem is authorized, then the ARP table is updated based on the instruction.

For example, an ARP process may receive an instruction to update an ARP table. The ARP process may determine whether the instruction originated from a DHCP server that is specified to be an authorized subsystem. If the instruction originated from the DHCP server, then the ARP process may update the ARP table based on the instruction. If the instruction did not originate from the DHCP server, then the ARP process may ignore the instruction, thereby preventing the ARP table from being updated based on the instruction.

Unlike previous approaches to updating ARP tables, techniques disclosed herein do not allow all ARP messages, regardless of their origin, to cause an ARP table to be modified. As a result, techniques disclosed herein can be used to prevent rogue users from modifying legitimate bindings contained in an ARP table. As another result, techniques disclosed herein can be used to prevent ARP tables from containing bindings that comprise network layer addresses that were not supplied by a DHCP server or other authorized subsystem.

In other aspects, the invention encompasses a computer apparatus and a computer-readable medium configured to carry out the foregoing steps.

2.0 Structural and Functional Overview

Figure 1:
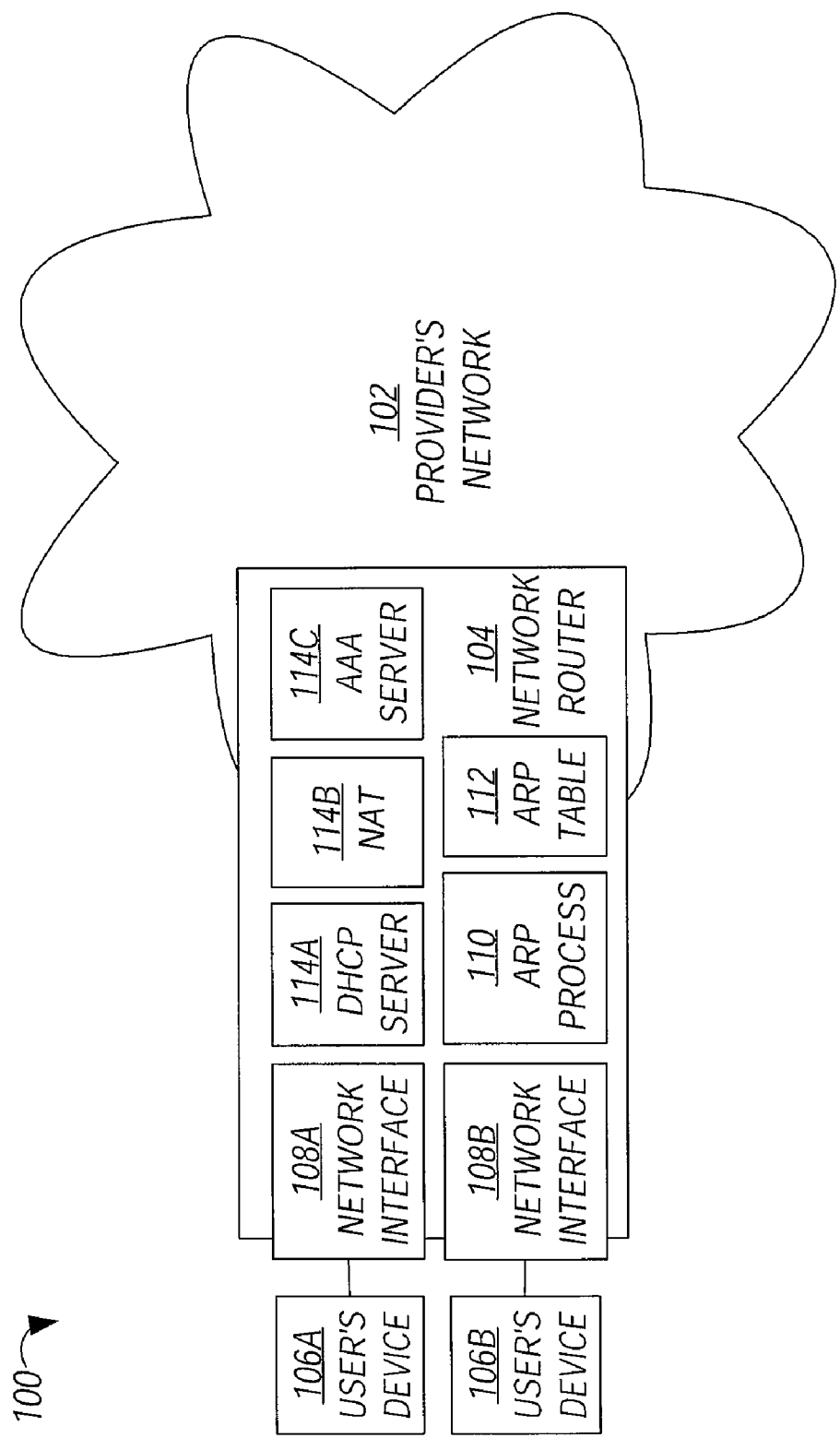
FIG. 1 is a block diagram that illustrates an overview of an example system that may be used to practice a method of restricting ARP table updates to updates originating from authorized subsystems.

FIG. 1 is a block diagram that illustrates an overview of an example system 100 that may be used to practice a method of restricting Address Resolution Protocol (ARP) table updates to updates originating from authorized subsystems. As used herein, a subsystem is any entity, process, device, or mechanism that is capable of sending an instruction that has the purpose or result of causing an ARP table to be updated. System 100 comprises a provider's network 102, a network router 104, and users' devices 106A and 106B. Systems of alternative embodiments may comprise more or fewer components than those in system 100.

Provider's network 102 may be a LAN, a WAN, one or more inter-networks, etc. Provider's network 102 comprises network router 104. Network router 104 comprises network interfaces 108A and 108B. User's device 106A is coupled communicatively to network router 104 through network interface 108A. User's device 106B is coupled communicatively to network router 104 through network interface 108B. Users' devices 106A and 106B may be coupled communicatively to router 104 through one or more cables, wireless connections, network hubs, and/or network bridges. In system 100, all data traffic flowing between provider's network 102 and either one of users' devices 106A and 106B flows through network router 104. Users' devices 106A and 106B may be computers, workstations, processes, applications, agents, etc.

Network router 104 further comprises an ARP process 110 and an ARP table 112. ARP process 110 receives all instructions to update ARP table 112. ARP table 112 is updated only by ARP process 110. Network router 104 encapsulates network layer data packets into data link layer frames based on entries contained in ARP table 112. For example, if ARP table 112 contains an entry that indicates a binding between a data link layer address of user's device 106A and a particular network layer address, then network router 104 will encapsulate, in frames that indicate the data link layer address of user's device 106A, data packets destined for the particular network layer address. Network router 104 will consequently deliver the frames to user's device 106A.

Unlike some other network routers, network router 104 is configured to not proactively discover data link layer addresses that correspond to network layer addresses. For example, even if network router 104 receives a data packet that indicates a destination network layer address that is not contained in ARP table 112, the network router will not attempt to learn which one of users' devices 106A and 106B is associated with the destination network layer address. ARP process 110 does not broadcast ARP messages that ask other network devices to tell network router 104 data link layer addresses that are associated with network layer addresses. Thus, if network router 104 receives a data packet that is addressed to a network layer address that is not contained in ARP table 112, then the network router will not encapsulate and forward the data packet.

According to one embodiment, ARP process 110 ignores all ARP messages that indicate that a particular data link layer address is associated with a particular network layer address. ARP process 110 does not add, remove, or modify entries in ARP table 112 based on such ARP messages. Therefore, in one embodiment, ARP table 112 can only be updated in response to instructions other than ARP messages. As a result, ARP table 112 cannot be contaminated with illegitimate bindings based on forged ARP messages. According to an alternative embodiment, ARP process 110 ignores only such ARP messages that also indicate selected network layer addresses and/or such ARP messages that also were received through selected ones of network interfaces 108A and 108B.

Network router 104 further comprises authorized subsystems 114A-114C. Authorized subsystems 114A-114C comprise DHCP server 114A; a device that is using or running Network Address Translation (NAT) 114B; and Authentication, Authorization, Accounting (AAA) server 114C. Network Address Translators are described in IETF RFC 3022. AAA servers are described in IETF RFC 2903. While, in system 100, DHCP server 114A, NAT 114B, and AAA server 114C are authorized subsystems, more or fewer or different subsystems than these may be authorized in systems of alternative embodiments. While network router 104 comprises authorized subsystems 114A-114C, in alternative embodiments, one or more authorized subsystems may be external to a network router.

In response to certain events, authorized subsystems 114A-114C send, to ARP process 110, instructions to update ARP table 112. Such instructions may include instructions to add, remove, or modify specific entries in ARP table 112. According to one embodiment, when ARP process 110 receives an instruction to update ARP table 112, the ARP process determines whether the instruction originated from an authorized subsystem. ARP process 110 may make this determination by determining whether the subsystem from which the instruction originated is identified in a set of specified authorized subsystems. If the instruction originated from an authorized subsystem, then ARP process 110 updates ARP table 112 based on the instruction. According to one embodiment, ARP process 110 ignores all instructions that did not originate from an authorized subsystem. As a result, ARP table 112 cannot be contaminated with bindings that were generated as a consequence of the automatic learning of a network layer address that a user did not obtain from an authorized subsystem.

When ARP table 112 is restricted to contain only bindings that were generated by authorized subsystems, network router 104 is restricted to forward data packets only to ones of users' devices 106A and 106B that were assigned a network layer address by one of authorized subsystems 114A-114C. Entries in ARP table 112 are "locked" relative to ARP messages from users' devices 106A and 106B. The process of adding an entry to an ARP table in response to an instruction from an authorized subsystem may be called "ARP locking." Entries in ARP table 112 are secure.

Figure 2:
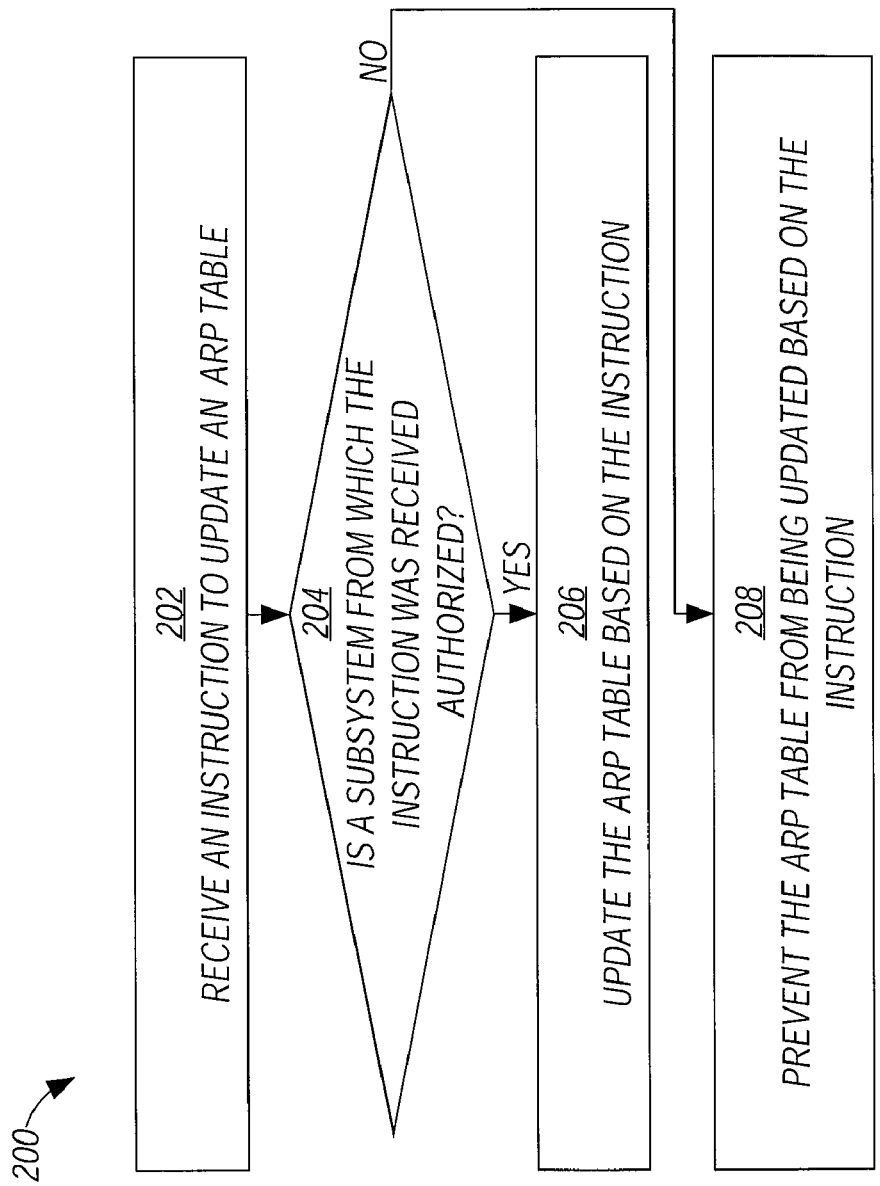
FIG. 2 is a flow diagram that illustrates a high level overview of one embodiment of a method of restricting ARP table updates to updates originating from authorized subsystems.

FIG. 2 is a flow diagram that illustrates a high level overview of one embodiment of a method 200 of restricting Address Resolution Protocol (ARP) table updates to updates originating from authorized subsystems. Such a method may be performed by any of many different mechanisms, such as, for example, ARP process 110 described above.

In block 202, an instruction is received to update an ARP table. For example, ARP process 110 may receive, from DHCP server 114A, an instruction to add, to ARP table 112, a binding between an IP address, which the DHCP server assigned to user's device 106A, and the user's device's MAC address.

In block 204, it is determined whether a subsystem from which the instruction originated is authorized. For example, ARP process 110 may determine whether the subsystem from which the instruction originated is contained in a set of one or more specified authorized subsystems. The set of one or more specified authorized subsystems may contain DHCP server 114A, NAT 114B, and AAA server 114C. For another example, ARP process 110 may determine whether the instruction was received through a command interface that is designed to receive instructions exclusively from authorized subsystems. If the subsystem is authorized, then control passes to block 206. If the subsystem is not authorized, then control passes to block 208.

In block 206, the ARP table is updated based on the instruction. For example, based on the specific details of the instruction, ARP process 110 may add a specified entry to, remove a specified entry from, or modify a specified entry within, ARP table 112.

According to one embodiment, in block 208, updating of the ARP table based on the instruction is prevented. For example, ARP process 110 may ignore an ARP message, from user's device 106B, that indicates that a particular IP address in ARP table 112A is associated with the MAC address of user's device 106B. In alternative embodiments, the ARP table may be updated based on the instruction if certain other specified conditions are satisfied.

As a result of method 200, an ARP table cannot be contaminated with entries that contain IP addresses that were not assigned by an authorized subsystem. This, in turn, helps to prevent unauthorized network access and billing errors.

Figure 3:
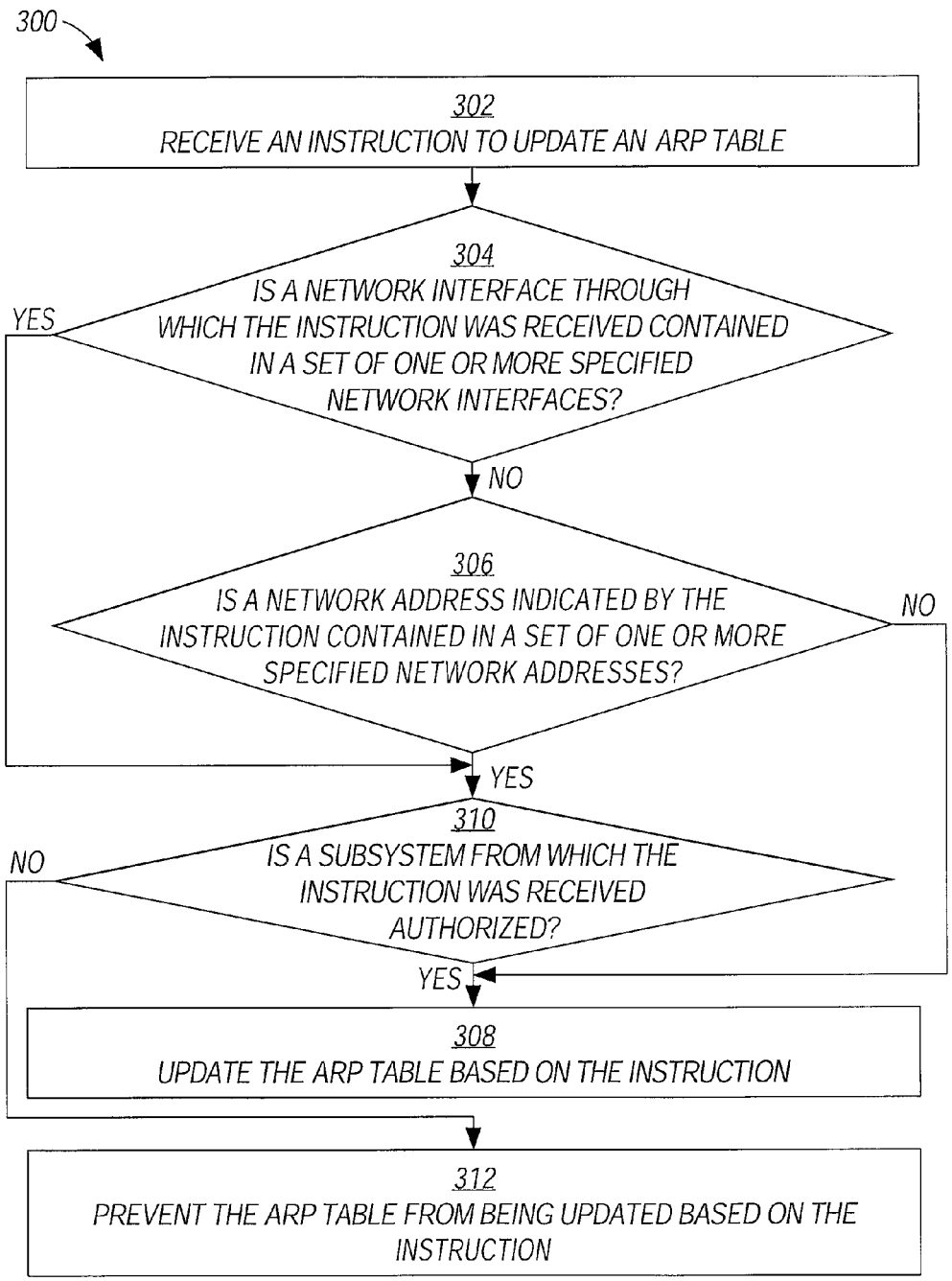
FIG. 3 is a flow diagram that illustrates one embodiment of a method of restricting selected ARP table updates to updates originating from authorized subsystems.

3.0 Method of Restricting ARP Table Updates to Updates Originating from Authorized Subsystems 3.1 Processing Received Updates It is sometimes desirable to allow an ARP table to be updated, under certain specified conditions, even in response to an instruction that did not originate from an authorized subsystem. For example, it may be desirable to prevent updates based on ARP messages received through certain specified network interfaces of a network router, and to freely allow updates based on ARP messages received through other network interfaces of the network router. It may be desirable to prevent updates that relate to network addresses within certain specified subnets of a network, and to freely allow updates that relate to network address within other subnets. FIG. 3 is a flow diagram that illustrates one embodiment of a method 300 of restricting selected ARP table updates to updates originating from authorized subsystems. Such a method may be performed by any of many different mechanisms, such as, for example, ARP process 110 described above.

In block 302, an instruction is received to update an ARP table. For example, ARP process 110 may receive, from DHCP server 114A, an instruction to add, to ARP table 112, a binding between an IP address, which the DHCP server assigned to user's device 106A, and the user's device's MAC address. For another example, ARP process 110 may receive, through network interface 108B, an ARP message that indicates that an IP address is associated with the MAC address of user's device 106B. Such an ARP message is an instruction to update ARP table 112.

In block 304, it is determined whether a network interface through which the instruction was received is contained in a set of one or more specified network interfaces. For example, if an ARP message was received through network interface 108B, then ARP process 110 may determine whether network interface 108B is contained in a set of one or more specified restricted network interfaces. If the network interface through which the instruction was received is contained in the set of one or more specified network interfaces, then control passes to block 310. Otherwise, control passes to block 306.

In block 306, it is determined whether a network address indicated by the instruction is contained in a set of one or more specified network addresses. For example, if an ARP message specifies that IP address 192.206.0.1 is associated with the MAC address of user's device 106B, then ARP process 110 may determine whether IP address 192.206.0.1 is contained in a set of one or more specified restricted subnets. A subnet describes a range of network addresses. If the network address specified by the instruction is contained in the set of one or more specified network addresses, then control passes to block 310. Otherwise, control passes to block 308.

In block 308, the ARP table is updated based on the instruction. For example, if an ARP message specifies that IP address 192.206.0.1 is associated with the MAC address of user's device 106B, then ARP process 110 may update ARP table 112 to contain an association between IP address 192.206.0.1 and the MAC address of user's device 106B.

In block 310, it is determined whether a subsystem from which the instruction originated is authorized. If the subsystem is authorized, then control passes to block 308. If the subsystem is not authorized, then control passes to block 312.

In block 312, updating of the ARP table based on the instruction is prevented.

As a result of method 300, certain entries in an ARP table may be locked and made secure against ARP messages coming through specified network interfaces. Certain entries in an ARP table may be locked and made secure against ARP messages that relate to specified network addresses. These features help to prevent billing errors and unauthorized network access.

3.2 Process of Sending an Instruction to Update an ARP Table

Figure 4A:
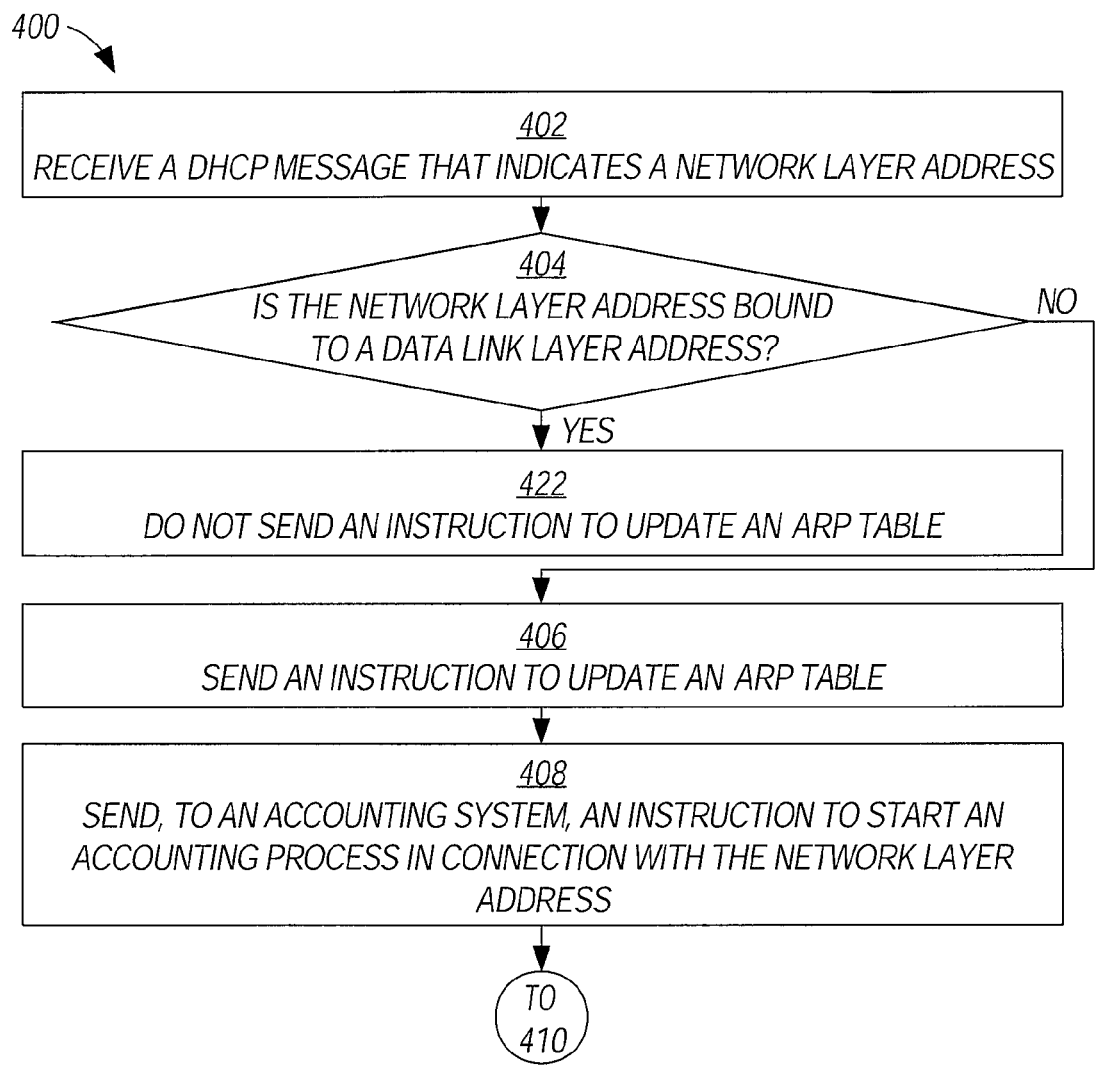
FIG. 4A and FIG. 4B are flow diagrams that illustrate one embodiment of a process for sending an instruction to update an ARP table.
Figure 4B:
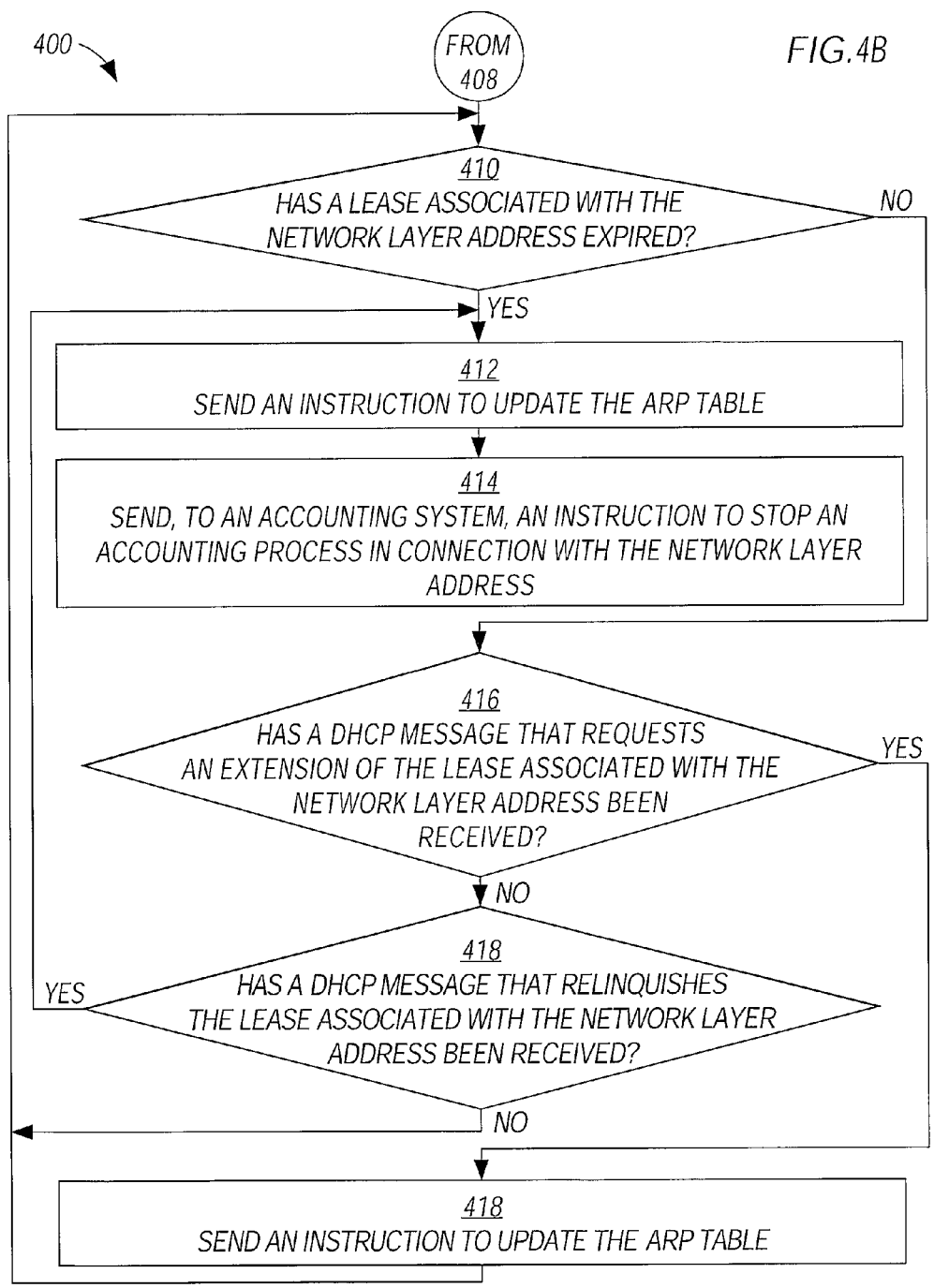

In response to specified events, certain authorized subsystems may send, to an ARP process such as ARP process 110, an instruction to update an ARP table such as ARP table 112. Such authorized subsystems may comprise DHCP server 114A, NAT 114B, AAA server 114C, and a Hypertext Transfer Protocol (HTTP) based authentication server (not shown). FIGS. 4A and 4B are flow diagrams that illustrate one embodiment of a process 400 of sending an instruction to update an ARP table. Such a process may be performed by any of many different mechanisms, such as, for example, DHCP server 114A described above.

In block 402, a DHCP message that indicates a network layer address is received. For example, DHCP server 114A may receive, from user's device 106A, a DHCPREQUEST message that indicates that the user's device accepts the DHCP server's offer to assign a particular IP address to the user's device. The DHCPREQUEST message indicates the particular IP address.

In block 404, in response to receiving the DHCP message, it is determined whether the network layer address is bound with a data link layer address. Continuing the example, DHCP server 114A may determine whether the particular IP address already is bound with a MAC address other than the MAC address of user's device 106A. If the network layer address is not bound with a data link layer address, then control passes to block 406. Otherwise, control passes to block 422.

In block 406, an instruction to update an ARP table is sent. For example, DHCP server 114A may send an instruction to ARP process 110. The instruction may indicate that ARP table 112 is to be updated to contain a binding between the particular IP address and the MAC address of user's device 106A. The instruction may indicate that the binding is valid for a specified period of time, such as the duration of the DHCP lease. Each entry in ARP table 112 may be associated with a timestamp that indicates a time at which the entry expires.

In block 408, an instruction is sent to an accounting system to start an accounting process in connection with the network layer address. For example, DHCP server 114A may send an instruction to a user accounting system that instructs the user accounting system to start keeping track of time in relation to a username that was associated with the particular IP address when the DHCP server assigned the particular IP address to user's device 106A. In response to the instruction, the user accounting system may begin to track how long the user associated with the username will be logged in to provider's network 102.

In block 410, it is determined whether a lease associated with the network layer address has expired. For example, DHCP server 114A may determine whether a lease of the particular IP address to user's device 106A has expired. If the lease has expired, then control passes to block 412. Otherwise, control passes to block 416.

In block 412, an instruction to update the ARP table is sent. For example, DHCP server 114A may send an instruction to ARP process 110. The instruction may indicate that ARP table 112 is to be updated to remove a binding between the particular IP address and the MAC address of user's device 106A. According to one embodiment, ARP process 110 automatically removes, from ARP table 112, bindings that are associated with timestamps that indicate past times, regardless of whether the ARP process has been specifically instructed to do so by an authorized subsystem.

In block 414, an instruction is sent to an accounting system to stop an accounting process in connection with the network layer address. For example, DHCP server 114A may send an instruction to the user accounting system that instructs the user accounting system to stop keeping track of time in relation to the username that is associated with the particular IP address. In response to the instruction, the user accounting system make a determination as to the total amount of time that the user was logged in to provider's network 102. The user accounting system may bill the user accordingly.

In block 416, it is determined whether a DHCP message, which requests an extension of the lease associated with the network layer address, has been received. For example, DHCP server 114A may receive, from user's device 106A, a DHCPREQUEST message that requests that the lease of the particular IP address to the user's device be extended. If such a DHCP message has been received, then control passes to block 418. Otherwise, control passes to block 420.

In block 418, an instruction to update the ARP table is sent. For example, DHCP server 114A may send an instruction to ARP process 110. The instruction may indicate that ARP table 112 is to be updated to indicate that a binding between the particular IP address and the MAC address of user's device 106A is to remain valid for a longer duration. In response ARP process 110 may update a timestamp associated with the binding to indicate a later expiration time. Control then passes back to block 410.

In block 420, it is determined whether a DHCP message, which relinquishes the lease associated with the network layer address, has been received. For example, DHCP server 114A may receive, from user's device 106A, a DHCPRELEASE message that relinquishes the lease of the particular IP address to the user's device. If such a DHCP message has been received, then control passes to block 412. Otherwise, control passes back to block 410.

In block 422, an instruction to update the ARP table is not sent. For example, because neither DHCP server 114A nor any other authorized subsystem sent an instruction to update ARP table 112, the ARP table remains unchanged.

In this manner, ARP table updates may originate from authorized subsystems, so that ARP table updates may be restricted to updates that originate from authorized subsystems. Where user's devices cannot receive data packets from a provider's network without obtaining access through an authorized subsystem, user accounting processes may be based on instructions received from authorized subsystems. As a result, user accounting processes cannot be circumvented by a forged ARP message or the use of a network layer address that was not obtained from an authorized subsystem.

While the examples above make reference to instructions being sent from DHCP server 114A in response to certain events, such as the lease or relinquishment of an IP address, instructions from other authorized subsystems similarly may be sent in response to events that relate specifically to those authorized subsystems. For example, NAT 114B may send instructions to update ARP table 112 in response to detecting data packets that indicate network addresses in specified networks. For another example, AAA server 114C may send instructions to update ARP table 112 in response to receiving authentication information from a user during a login process.

4.0 Implementation Mechanisms—Hardware Overview

Figure 5:
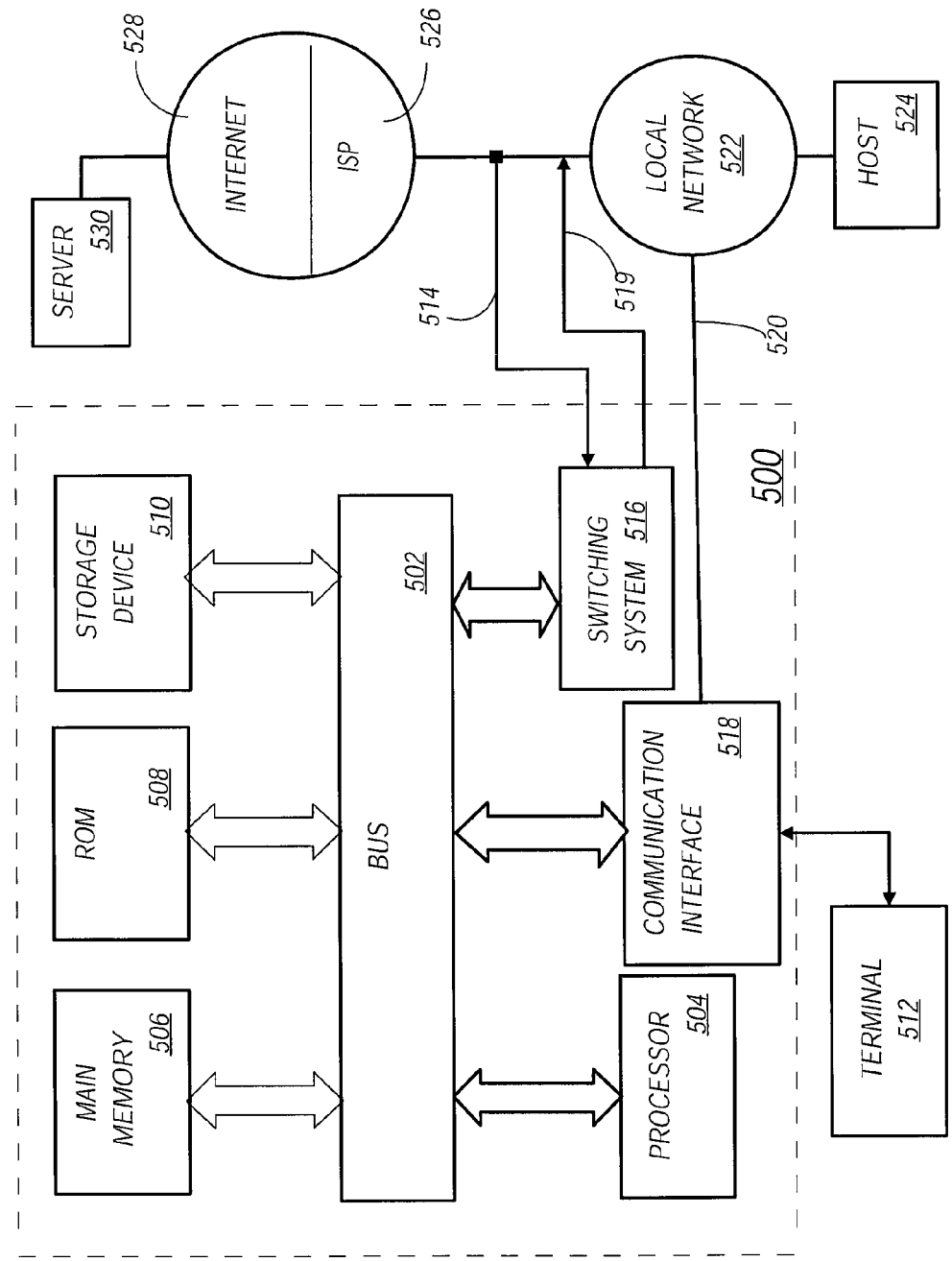
FIG. 5 is a block diagram that illustrates a computer system upon which an embodiment may be implemented.

FIG. 5 is a block diagram that illustrates a computer system 500 upon which an embodiment of the invention may be implemented. The preferred embodiment is implemented using one or more computer programs running on a network element such as a router device. Thus, in this embodiment, the computer system 500 is a router.

Computer system 500 includes a bus 502 or other communication mechanism for communicating information, and a processor 504 coupled with bus 502 for processing information. Computer system 500 also includes a main memory 506, such as a random access memory (RAM), flash memory, or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk, flash memory or optical disk, is provided and coupled to bus 502 for storing information and instructions.

A communication interface 518 may be coupled to bus 502 for communicating information and command selections to processor 504. Interface 518 is a conventional serial interface such as an RS-232 or RS-422 interface. An external terminal 512 or other computer system connects to the computer system 500 and provides commands to it using the interface 514. Firmware or software running in the computer system 500 provides a terminal interface or character-based command interface so that external commands can be given to the computer system.

A switching system 516 is coupled to bus 502 and has an input interface 514 and an output interface 519 to one or more external network elements. The external network elements may include a local network 522 coupled to one or more hosts 524, or a global network such as Internet 528 having one or more servers 530. The switching system 516 switches information traffic arriving on input interface 514 to output interface 519 according to pre-determined protocols and conventions that are well known. For example, switching system 516, in cooperation with processor 504, can determine a destination of a packet of data arriving on input interface 514 and send it to the correct destination using output interface 519. The destinations may include host 524, server 530, other end stations, or other routing and switching devices in local network 522 or Internet 528.

The invention is related to the use of computer system 500 for restricting ARP table updates to updates originating from authorized subsystems. According to one embodiment of the invention, restricting ARP table updates to updates originating from authorized subsystems is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. One or more processors in a multi-processing arrangement may also be employed to execute the sequences of instructions contained in main memory 506. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector coupled to bus 502 can receive the data carried in the infrared signal and place the data on bus 502. Bus 502 carries the data to main memory 506, from which processor 504 retrieves and executes the instructions. The instructions received by main memory 506 may optionally be stored on storage device 510 either before or after execution by processor 504.

Communication interface 518 also provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for restricting ARP table updates to updates originating from authorized subsystems as described herein.

Processor 504 may execute the received code as it is received and/or stored in storage device 510, or other nonvolatile storage for later execution. In this manner, computer system 500 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of restricting Address Resolution Protocol (ARP) table updates, the method comprising:
   receiving, at a computing device, instructions to update an ARP table;
   for each instruction of said instructions, determining at which of a plurality of interfaces of the computing device the instruction was received;
   in response to determining that a first instruction of said instructions was received at a first interface of the computing device, automatically updating the ARP table based on the first instruction;
      wherein the first interface of the computing device is configured to receive instructions exclusively from one or more authorized subsystems, said one or more authorized subsystems being either internal or external to the computing device;
   in response to determining that a second instruction of said instructions was received at a second interface of the computing device that is different than the first interface of the computing device, not automatically updating the ARP table based on the second instruction;
   wherein the method is performed by the computing device.

2. The method of claim 1, wherein:
   the computing device is a router;
   the method is performed by an ARP process executing at the router; and
   the first interface is a command interface used exclusively by one or more subsystems of the router, wherein the one or more subsystems of the router are the one or more authorized subsystems.

3. The method of claim 2, wherein the second interface is a network interface configured to receive messages from one or more devices external to the router.

4. The method of claim 2 wherein the one or more subsystems of the router include at least one of: a Dynamic Host Configuration Protocol (DCHP) server, a Network Address Translator (NAT), an Authentication, Authorization, Accounting (AAA) server, and a Hypertext Transfer Protocol (HTTP) server.

5. The method of claim 1, wherein not automatically updating the ARP table based on the second instruction comprises:
   ignoring the second instruction.

6. The method of claim 1, wherein not automatically updating the ARP table comprises updating the ARP table only if one or more conditions are satisfied, wherein the one or more conditions are based on at least one of:
   whether a particular network interface from which the second instruction originated is contained in a set of one or more specified network interfaces; and
   whether a particular network address indicated by the second instruction is contained in a set of one or more specified network addresses.

7. The method of claim 1, further comprising:
   determining whether a specified amount of time has passed since a time indicated by a timestamp associated with an entry in the ARP table; and
   if the specified amount of time has passed, then removing the entry from the ARP table.

8. The method of claim 1, wherein the ARP table is updated only in response to instructions that are not ARP messages.

9. The method of claim 1, wherein:
   said instructions are a first set of instructions belonging to a plurality of instructions;
   the plurality of instructions includes a second set of instruction consisting of instructions in the plurality of instructions that are not in the first set of instructions; and
   the method further comprises:
      receiving, at the computing device, the plurality of instructions;
      determining, for each instruction in the plurality of instructions, to which of the first set of instructions and the second set of instructions the instruction belongs, said determining being based on one or more of: a network interface indicated for the network device from which the instruction originated and the network address indicated for the network device from which the instruction originated;
      automatically updating the ARP table based on instructions in the second set of instructions.

10. A method of sending an instruction to update an Address Resolution Protocol (ARP) table, the method comprising:
receiving a message that indicates a network layer address, wherein the message is one of a DHCP message or AAA authentication message;
in response to receiving the message, determining whether the network layer address is bound with any data link layer address; and
in response to the determining that the network layer address indicated by the message is not bound with any data link layer address, sending an instruction to update an ARP table;
wherein the method is performed by one or more computing devices.

11. The method of claim 10, wherein:
the method is performed by a AAA Server.

12. The method of claim 11, wherein:
the method is performed by a DHCP Server;
the message is a DHCPREQUEST message that indicates that a client has accepted an offer by the DHCP Server to assign the network layer address to the client;
the instruction is to update the ARP table to contain a binding between the network layer address and a data link layer address of a client that sent the message.

13. The method of claim 10, further comprising:
receiving a particular DHCP message that requests a modification of a lease;
wherein the modification is to either extend or relinquish the lease;
in response to receiving the particular DHCP message, sending an instruction to update the ARP table based upon the modification.

14. The method of claim 10, further comprising:
determining whether a lease associated with the network layer address has expired; and
if the lease has expired, then sending an instruction to remove, from the ARP table, an entry that contains the network layer address.

15. One or more non-transitory storage media storing instructions which, when executed by one or more computing devices, cause:
receiving, at a computing device, instructions to update an ARP table;
for each instruction of said instructions, determining at which of a plurality of interfaces of the computing device the instruction was received;
in response to determining that a first instruction of said instructions was received at a first interface of the computing device, automatically updating the ARP table based on the first instruction;
wherein the first interface of the computing device is configured to receive instructions exclusively from one or more authorized subsystems, said one or more authorized subsystems being either internal or external to the computing device;
in response to determining that a second instruction of said instructions was received at a second interface of the computing device that is different than the first interface of the computing device, not automatically updating the ARP table based on the second instruction.

16. The one or more storage media of claim 15, wherein:
the computing device is a router;
the instructions implement an ARP process executing at the router; and
the first interface is a command interface used exclusively by one or more subsystems of the router, wherein the one or more subsystems of the router are the one or more authorized subsystems.

17. The one or more storage media of claim 16 wherein the one or more subsystems of the router include at least one of: a Dynamic Host Configuration Protocol (DCHP) server, a Network Address Translator (NAT), an Authentication, Authorization, Accounting (AAA) server, and a Hypertext Transfer Protocol (HTTP) server.

18. The one or more storage media of claim 15, wherein not automatically updating the ARP table based on the second request comprises:
ignoring the second request.

19. The one or more storage media of claim 15, wherein not automatically updating the ARP table comprises updating the ARP table only if one or more conditions are satisfied, wherein the one or more conditions are based on at least one of:
whether a particular network interface from which the second instruction originated is contained in a set of one or more specified network interfaces; and
whether a particular network address indicated by the second instruction is contained in a set of one or more specified network addresses.

20. The one or more storage media of claim 15, wherein:
said requests are a first set of requests belonging to a plurality of requests;
the plurality of requests includes a second set of request consisting of requests in the plurality of requests that are not in the first set of requests; and
the one or more storage media further store instructions which, when executed by the one or more computing devices, cause:
receiving, at the computing device, the plurality of requests;
determining, for each request in the plurality of requests, to which of the first set of requests and the second set of requests the request belongs, said determining being based on one or more of: a network interface indicated for the network device from which the request originated and the network address indicated for the network device from which the request originated;
automatically updating the ARP table based on requests in the second set of instructions.

21. One or more non-transitory storage media storing instructions which, when executed by one or more computing devices, cause:
receiving a message that indicates a network layer address, wherein the message is one of a DHCP message or AAA authentication message;
in response to receiving the message, determining whether the network layer address is bound with any data link layer address; and
in response to the determining that the network layer address indicated by the message is not bound with any data link layer address, sending an instruction to update an ARP table;
wherein the method is performed by one or more computing devices.

22. The one or more storage media of claim 21, wherein:
the method is performed by a AAA Server.

23. The one or more storage media of claim 22, wherein:
the method is performed by a DHCP Server;

the message is a DHCPREQUEST message that indicates that a client has accepted an offer by the DHCP Server to assign the network layer address to the client;

the instruction is to update the ARP table to contain a binding between the network layer address and a data link layer address of a client that sent the message.

24. The one or more storage media of claim 21, wherein the one or more storage media further store instructions which, when executed by the one or more computing devices, cause:

receiving a particular DHCP message that requests a modification of a lease;

wherein the modification is to either extend or relinquish the lease;

in response to receiving the particular DHCP message, sending an instruction to update the ARP table based upon the modification.

25. The one or more storage media of claim 21, wherein the one or more storage media further store instructions which, when executed by the one or more computing devices, cause:

determining whether a lease associated with the network layer address has expired; and if the lease has expired, then sending an instruction to remove, from the ARP table, an entry that contains the network layer address.

* * * * *